United States Patent [19]

Hart

[11] 3,736,560
[45] May 29, 1973

[54] APPARATUS FOR DETECTING AND SIGNALING LIGHT ATTENUATION

[76] Inventor: Atlee S. Hart, 27530 Abington Road, Southfield, Mich. 48075

[22] Filed: Aug. 11, 1971

[21] Appl. No.: 170,834

[52] U.S. Cl. .................. 340/53, 315/82, 340/52 R, 340/251
[51] Int. Cl. .............................. B60q 1/00, 356 206
[58] Field of Search ................... 340/53, 52 R, 251; 307/10 LS; 180/103; 315/82, 134; 250/209 X, 209

[56] References Cited

UNITED STATES PATENTS

| | | | |
|---|---|---|---|
| 3,182,193 | 5/1965 | Ellner et al. | 250/43.5 R |
| 3,447,370 | 6/1969 | Tanzman | 250/209 X |
| 3,541,504 | 10/1970 | Bush | 340/52 R |
| 3,514,751 | 5/1970 | Pascente | 340/52 R |
| 3,609,450 | 9/1971 | Hart | 315/82 |

Primary Examiner—John W. Caldwell
Assistant Examiner—Glen R. Swann, III
Attorney—William T. Sevald

[57] ABSTRACT

An apparatus for detecting the light output loss of a headlamp due to deposited dirt-film obstructing light emission for activating washing nechamism and/or for signaling the driver to wash the headlamps and/or to actuate the headlamp washing mechanism to remove the deposited dirt-film, having a reference photo electric cell on the lamp surface to prevent dirt-film entry therebetween and a reading photo electric cell spaced from the lamp surface to permit dirt-film to enter and deposit therebetween. The output from each cell is fed to a differential amplifier and any substantial output from the amplifier actuates the signal to the driver and/or the headlamp washing mechanism. A potentiometer and/or a variable resistor in the lines between the cells and the amplifier allows balancing the amplifier at null or low output when the headlamp is devoid of dirt-film. Upon the presence of dirt-film between the reading cell and the headlamp, the amplifier becomes unbalanced and emits sufficient EMF to power a signal to the driver and/or to actuate headlamp washing mechanism. The apparatus is automatic, may be turned on and off with the headlamps of a vehicle, and may actuate washing mechanism and/or a warning lamp directly or through a relay.

5 Claims, 1 Drawing Figure

PATENTED MAY 29 1973
3,736,560
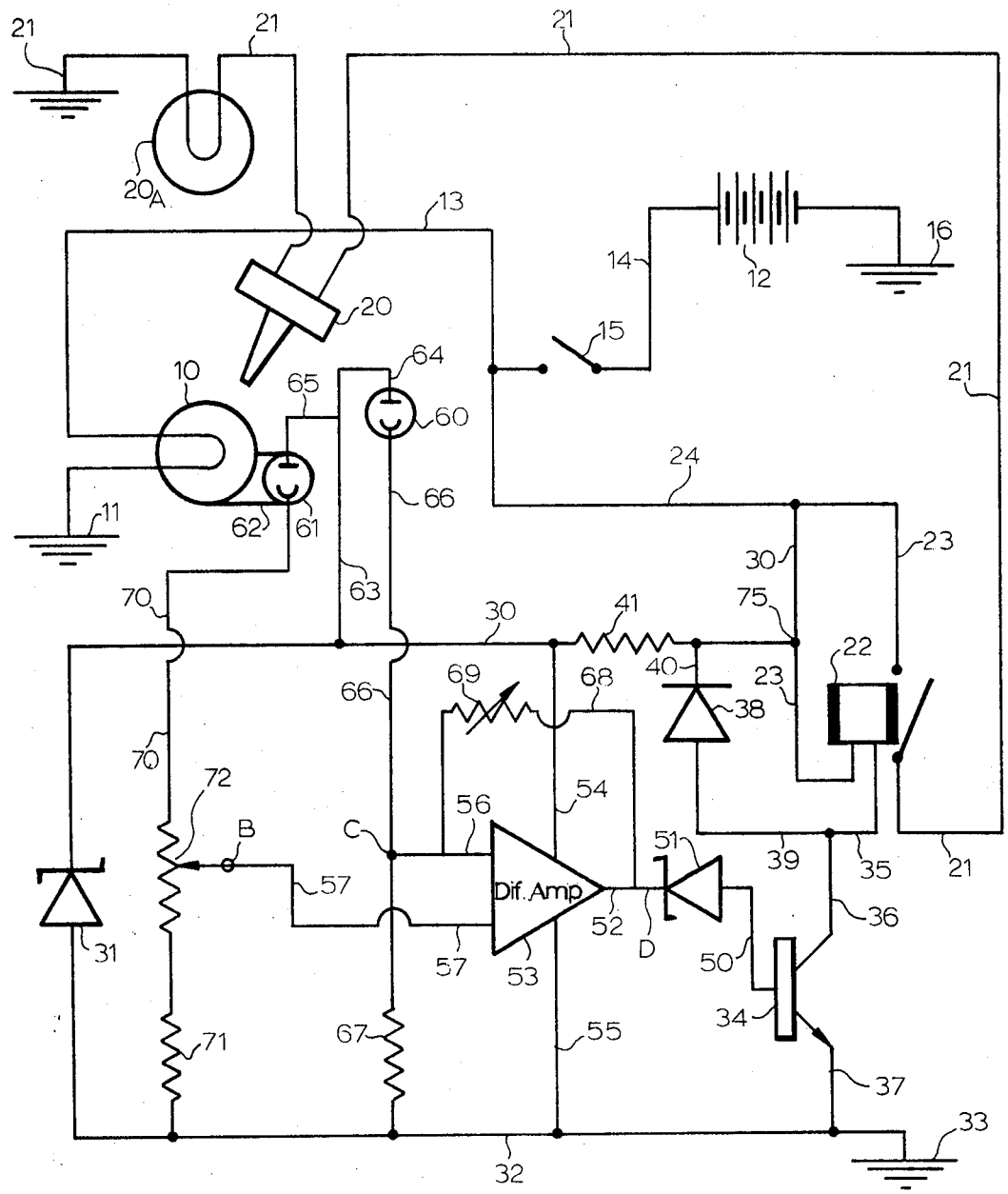
INVENTOR.
Atlee S. Hart
BY *William P. Sevald*
ATTORNEY

_3,736,560_

APPARATUS FOR DETECTING AND SIGNALING LIGHT ATTENUATION

BACKGROUND OF THE INVENTION

This invention relates to apparatus for detecting diminished light emission from lamps, such as vehicle headlamps and taillamps due to accumulation of dirt-film on the surface of the lamps and for actuating lamp washing mechanism and/or to signal the driver to wash the lamps automatically or manually to remove the dirt-film thereby restoring undiminished light beam emission.

While it is recognized that the accumulation of dirt-film on lamps seriously attenuates their light emission and adds substantially to the dangers inherent in night driving, the driver has no direct way of knowing or realizing the quantity of light-loss he is experiencing as the condition of the surface of the headlamps cannot be seen and the human eye iris automatically diaphanously opens to gather more light. Thus the strain of night driving with dirty headlamps is additionally tiring and difficult for the driver to detect until the condition is extremely bad.

SUMMARY OF THE PRESENT INVENTION

With the foregoing in view, it is a primary object of the invention to provide apparatus which detects appreciable attenuation of the light beam of a lamp at a point substantially before the driver would be aware of the fact that light emission was appreciably reduced.

A further object of the invention is to provide apparatus which reads light emission whether impaired or not relative to unimpaired light emission to provide a reference norm for determining impairment.

A further object of the invention is to provide apparatus which automatically signals the driver to wash the lamps and/or actuates the headlamp washing mechanism to remove the accumulated dirt-film to restore the light beam emission to full intensity.

Further objects of the invention are to increase the safety of night driving, to reduce the strain and fatigue of night driving, to detect light impairment before the driver can, and to provide apparatus which is simple in design and construction, inexpensive to manufacture and install, and which is durable and dependable.

These and other objects of the invention will become apparent by reference to the following description of an apparatus for detecting headlamp light emission attenuation and for signaling the driver and/or washing mechanism embodying the invention taken in connection with the accompanying drawing, in which:

DESCRIPTION OF THE DRAWING

The FIGURE is a schematic wiring diagram showing a lamp, detection system components, a driver warning lamp, and washing mechanism diagramatically.

DETAILED DESCRIPTION OF THE ILLUSTRATED EMBODIMENT side at 16

Referring now to the drawing wherein like numerals refer to like and corresponding parts, a lamp such as a headlamp 10 is grounded on one side at 11 and on the other side connected to one side of electric power supply 12 via lines 13 and 14 and a switch 15. The power supply 12 is grounded on the other side to complete the circuit.

Washing mechanism 20 at the headlamp 10, such as a jet spray and/or wiper blades and/or a driver warning lamp 20A, is powered by a circuit of which a line 21 is a portion. A normally open relay 22 in the line 21 controls the circuit to the washing mechanism 20 and warning lamp 20A. Upon the relay 22 closing, the washer mechanism 20 cleans the headlamp 10 and/or the warning lamp 20A is lighted. One side of the relay 22 is connected to the power supply 12 by line 23 and line 24. The other side of the relay 22 is connected in the circuits of the detecting apparatus, now described.

The detecing, signaling, and/or actuating apparatus includes a line 30 leading from the line 24 to a zener diode 31 and a line 32 leading from the diode 31 to a ground 33. The other side of the relay 22 is connected to a ground 33 through a transistor switch 34 via lines 35, 36, and 37. A diode 38 prevents power surge from the relay 22 to transistor 34 via lines 39 and 40. Thus when the transistor 34 transmits current, the relay 22 is actuated and closes its switch to power the washing mechanism 20 and warning lamp 20A. A resistor 41 in the line 30 and the zener diode 31 provide accurate and stable voltage on line 30.

Transmission signal current is fed to the transistor 34 via line 50, a zener diode 51, line 52, and a differential amplifier 53. A power circuit to the amplifier 53 is provided by lines 54 and 55 between lines 30 and 32 respectively. Two signal currents are supplied separately to the amplifier 53 by lines 56 and 57.

A photo electric cell 60 is spaced from the headlamp 10 and reads the ambient condition of light emission therefrom as unimpaired or as impaired by dirt-film on the headlamp 10. The cell 60 is referred to as the ambient condition "reading cell 60." A photo electric cell 61 is adjacent the headlamp 10. Means, such as a shroud 62, prevent dirt-film interdisposition between the cell 61 and the headlamp 10. The cell 61 reads the full unimpaired intensity of the headlamp 10 and is referred to as the "reference cell 61." A line 63 leads from power line 30 to one side of both cells 60 and 61 via branch lines 64 and 65 respectively.

A line 66 leads from the reading cell 60 to ground line 32 through a resistor 67. The line 66 is connected by the line 56 to one side of the differential amplifier 53. A shunt-bridge circuit line 68 around the amplifier 53 from line 56 to line 52 contains a variable resistor 69 for adjusting the sensitivity of the system to dirt-film.

A line 70 leads from the reference cell 61 to ground line 32 through a resistor 71 and a resistor-potentiometer 72. The line 70 is connected by the line 57 to the other side of the differential amplifier 53 through the potentiometer 72. The potentiometer 72 provides means for adjusting one signal current input to the amplifier 53 for balancing relative to the other.

It will thus be understood when the input signal currents of lines 56 and 57 are substantially equal at the differential amplifier 53, as balanced by resistor 72, that the amplifier 53 is at relative null and transmits no adequate power. Conversely, when the reading cell 60 furnishes less signal current because of light impairment, the reference cell 61 signal current overbalances and causes the amplifier 53 to transmit current which is fed to the transistor 34 causing it, in turn, to transmit current to operate the relay 22 to close the circuit of line 21 including the washing mechanism 20 and/or the warning lamp 20A on the dash board of the vehicle.

In operation, assuming that the headlamp 10 is on and clear, voltage is applied to terminal 75 and regulated by resistor 41 and zener diode 31. This regulation provides an accurate and stable voltage on line 30 for proper operation of the differential amplifier 53 and the photo cell bridge circuits 66 and 70.

The regulated voltage causes one current to flow through photo cell 61, through variable resistor-potentiometer 72, and through resistor 71 to ground 33. This current causes a certain voltage (approximately 4 volts) to be developed at point B. A second current flows through photo cell 60 and through resistor 67 to ground 33 causing a voltage to be developed at point C.

With a clean headlamp 10, the zeroing control potentiometer 72 and/or resistor 69 are adjusted so that the voltages at B and C are substantially equal. Since the differential amplifier 53 sees these balanced voltages as zero input signal, the amplifier 53 essentially is off and the amplifier 53 output rests at ½ the supply voltage, or approximately 4 volts. This 4 volts is not adequate to cause a current flow through a zener diode 51 and the base emitter junction of transistor 34 and therefore, the transistor 34 is in an "off" state and relay 22 is not energized. Diode 38 is used to prevent excessive voltages developed across the coil of the relay 22 from damaging the transistor 34.

If, now, the headlamp 10 becomes dirty, the light impinging on reference cell 61 is not affected because of the intimate contact with the headlamp 10. The light falling on reading cell 60, however, is reduced by the attentuation caused by the dirt-film on the surface of the headlamp 10. This reduction in light on the reading cell 60 causes a change in the voltage at point C such that there is now a difference in voltages between points B and C.

The difference voltage is amplified by the differential amplifier 53 such that the amplifier 53 output voltage point D is high enough to cause a current to flow through zener diode 51 and the base-emitter junction of the transistor 34. The transistor 34 is thereby forced into an "on" state, which energizes relay 22 and causes it to close its switch portion in line circuit 21.

As line circuit 21 includes the headlamp washing mechanism 20 and/or a dash board warning signal 20A, they are energized upon the closing of the relay 22 and wash the dirt-film from the headlamp 10 and/or signal the driver to actuate headlamp washing mechanism or to wash the headlamp manually whereupon the headlamp 10 is cleaned, the light to reading cell 60 is no longer attenuated, the voltages at points B and C are in substantial equilibrium, the differential amplifier 53 terminates material power transmission, the relay 22 opens, and the system is thus restored to normal.

While a relay 22 is shown in the described preferred embodiment to actuate the washing mechanism 20 and/or the warning lamp 20A, it will be understood that the relay 22 may be deleted and the mechanism 20 and/or warning lamp 20A operated directly by the transistor 34.

Many similar circuit configurations are applicable, having either discrete or integrated components which use the differential between reference and reading photo cells to provide operation of an apparatus to actuate headlamp washing mechanism and/or to signal the driver to wash the headlamps either manually or by actuating the headlamp washing mechanism.

The invention provides means for detecting the reduction in light output of lamps caused by dirt-film attenuation and for signaling the driver to wash the headlamps and/or for actuating mechanism to wash the headlamps and thus provides a safety facility for drivers in night driving which is beyond the capability of the human eye and keeps the light emission at maximum both to the safety and to the reduction of eye strain and fatigue of the driver. The invention is defined in the appended claims.

I claim:

1. Detector apparatus for determining when the output of a lamp is diminished by the presence of dirt-film on its light emitting surface and for signaling that the lamp needs washing to remove the dirt-film from the surface to restore the light output to normal, comprising, a reference photo electric cell positionable at the light emitting surface of the lamp for preventing the introduction of dirt-film therebetween, an ambient condition reading photo electric cell positionable at a point spaced from the light emitting surface of the lamp to permit the entrance and deposit of dirt-film therebetween, lines supplying EMF to both said cells, a differential amplifier having opposed signal sides, a line leading from said reference cell to one said signal side of said differential amplifier, a line leading from said reading cell to the other said signal side of said differential amplifier, a circuit supplying EMF to said differential amplifier, an output circuit leading from said differential amplifier, and reactive means in said output circuit;

said differential amplifier producing output insufficient to power said reactive means when the signal inputs to said differential amplifier from both said cells are substantially equal as a result of substantially equal light obstructing conditions at both said cells, said differential amplifier producing output sufficient to power said reactive means when the input from both said cells is not substantially equal as a result of substantially unequal light obstructing conditions due to dirt-film attenuating light emission to said reading cell;

said reactive means when powered providing a signal to wash the lamp.

2. In a system as set forth in claim 1, a potentiometer lying in said line between said reference cell and said differential amplifier;

said potentiometer providing means for increasing and decreasing the input signal voltage to said differential amplifier from said one cell for adjusting the input from said one cell in substantial balance with the input from said other cell when no dirt-film obstructs light to said reading cell.

3. In a device as set forth in claim 1, a warning lamp connected to said reactive means to advise the driver of light attenuation.

4. In a device as set forth in claim 1, washing mechanism connected to said reactive means to wash the lamp surface clean.

5. In a device as set forth in claim 1, a relay connected to said reactive means for closing a circuit.

* * * * *